United States Patent Office 3,366,459
Patented Jan. 30, 1968

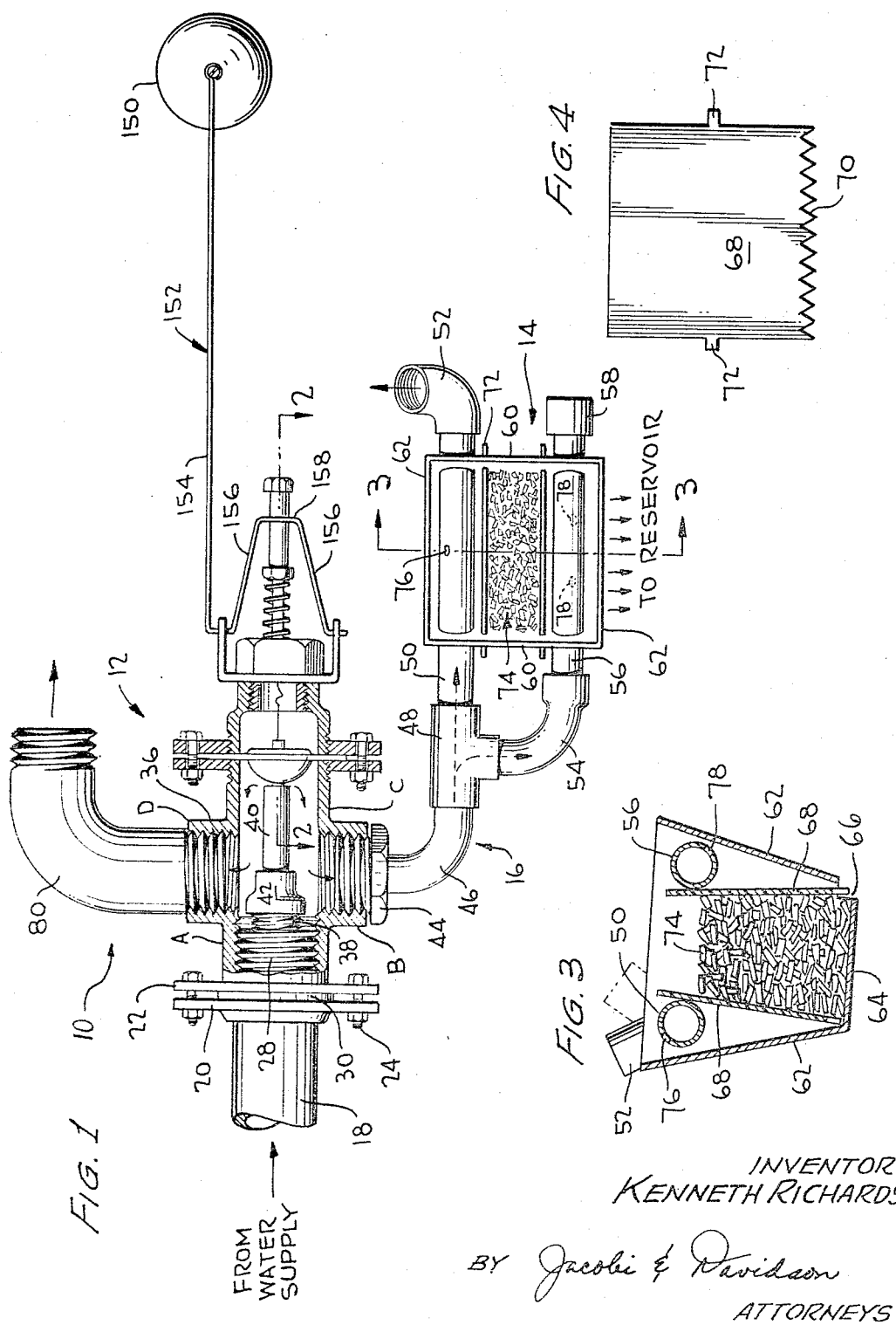

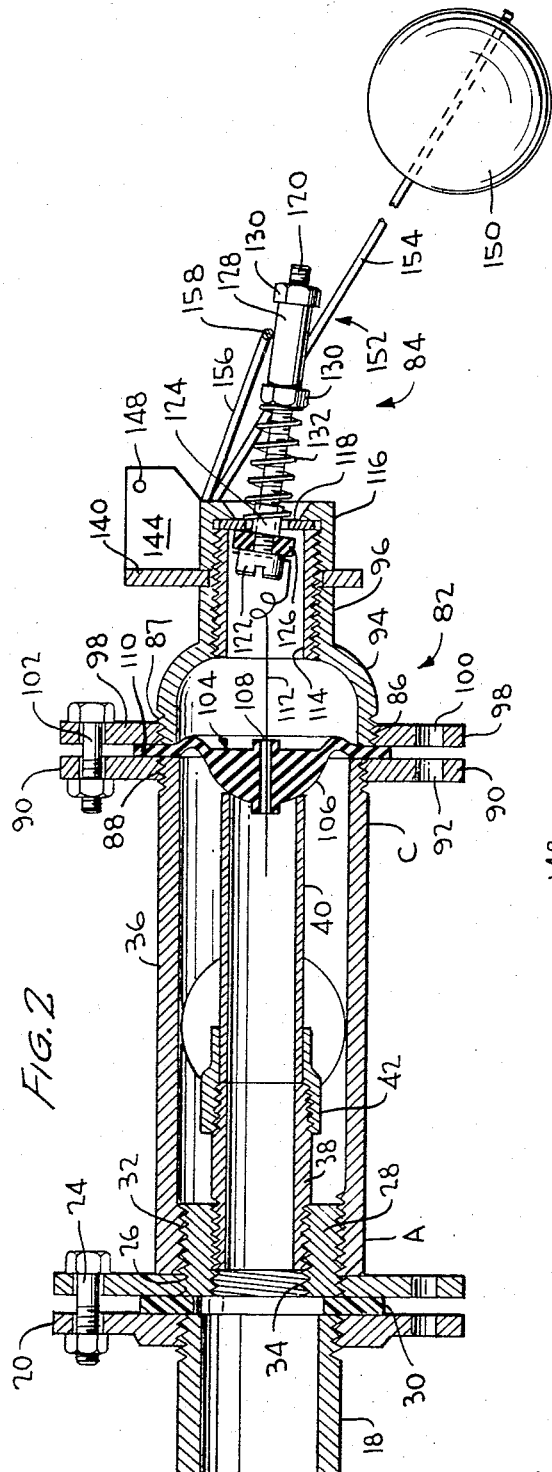
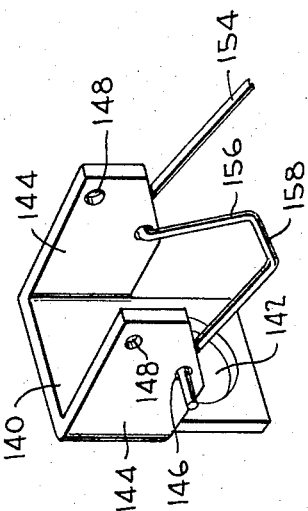
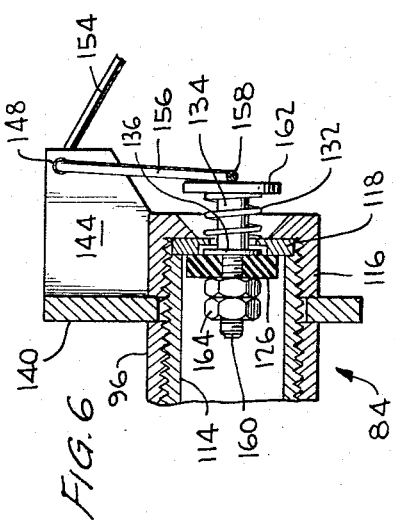
INVENTOR,
KENNETH RICHARDS
BY Jacobi & Davidson
ATTORNEYS

3,366,459
WATER CHLORINATING UNIT
Kenneth Richards, Wai Rua, Gordon Town,
Parish of Saint Andrew, Jamaica
Filed Nov. 3, 1966, Ser. No. 591,907
10 Claims. (Cl. 23—272.7)

ABSTRACT OF THE DISCLOSURE

A water chlorinating unit connected between a water source and a liquid supply to be chlorinated, including valve means coupled with said water source and controlled by float control means responsive to the level of the liquid in the supply. A receptacle contains the chlorinating material and water from the source is divided into two branch streams, one of which contacts the chlorinating material to dissolve a portion thereof and the other of which combines with the chlorinated stream to dilute the level of chlorination therein. The combined streams are then fed to the liquid supply.

---

This invention relates to a unit for chlorinating water supplies, such as rural gravity or pump operated water supplies, swimming pools, or any other form of liquid reservoir in which it is desired to chlorinate the liquid. More particularly, this invention relates to a new and improved chlorinating device using a hypochlorite supply, in tablet form, wherein the tablets are gradually dissolved to provide a hypochlorite solution, which is supplied to the water or other liquid reservoir to be chlorinated.

With particular respect to rural water supplies, it has been found desirable to chlorinate such supplies for reasons of sanitation and to prevent the water from becoming contaminated and diseased. Very often, such rural water supplies are provided at remote locations which cannot readily be serviced at frequent intervals, and accordingly, it has been found desirable to provide a means for reliably and accurately chlorinating such water supplies in such a manner that the chlorination will continue, wholly unattended, for prolonged intervals of time.

There have been in the past certain proposals and devices which were intended to accomplish the same function as that of the present invention, but in actual practice, such devices were found to be unsatisfactory. That is, it was discovered that the tablets dissolved at far too rapid a rate, thereby requiring replenishment as often as three times a day. Naturally, a unit of this type was wholly unsatisfactory for use at a remote and unattended location. Also, such prior devices gave erratic chlorine dosage at different water levels. When the reservoir was almost full, such devices did not operate at all.

With the foregoing in mind, it is, therefore, a primary object of the present invention to overcome the difficulties and deficiencies associated with prior art units of this type, and to provide in their stead, a new and improved unit for chlorinating a water supply.

Another object of the present invention is to provide a chlorinating unit which operates accurately, reliably and virtually unattended, yet, is relatively inexpensive to produce and maintain.

Another object of the present invention is to provide a chlorinating unit which utilizes a quantity of water soluble chlorinating material which is gradually dissolved and added to the water supply to be chlorinated.

Another object of the present invention is to provide a chlorinating unit for a liquid reservoir, wherein the chlorinating unit is responsive to the level of the liquid in the reservoir so that when the reservoir is full, no further chlorination of the water will take place.

Another object of the present invention is to provide a chlorinating unit capable of chlorinating a high flow of water with an operating head as low as one foot.

Another object of the present invention is to provide a chlorinating unit wherein the quantity of chlorinated water provided per unit time to the reservoir can be selectively adjusted.

Other objects, advantages and salient features of the present invention will become apparent from the following detailed description, which, taken in conjunction with the annexed drawings, discloses a preferred embodiment thereof.

Referring now to the drawings:

FIGURE 1 is a top plan view, partially in section, of a chlorinating unit in accordance with the principles of the present invention;

FIGURE 2 is a fragmentary sectional view thereof, taken substantially along the line 2—2 of FIGURE 1;

FIGURE 3 is a sectional view of the receptacle means of the present invention, taken substantially along the line 3—3 of FIGURE 1;

FIGURE 4 is a side elevational view of a guide wall means utilized in the receptacle means of the present invention;

FIGURE 5 is a perspective view of a portion of the float control means of the present invention; and, FIGURE 6 is a fragmentary sectional view of a modified form of pilot valve assembly.

In general, the invention resides in a new and improved chlorinating unit generally designated 10, adapted to be interconnected between a water source and a liquid supply which is to be chlorinated. The main source of water flow is from the water source and it hence passes through the chlorinator 10 as it is delivered to the liquid supply. The unit 10 includes a valve means generally designated 12, a receptacle means generally designated 14 which is adapted to contain a quantity of substantially dry water soluble chlorinating material, and a conduit means generally designated 16, interconnecting the valve means 12 and the receptacle means 14.

Water from a suitable source thereof is supplied to the valve means 12 through a pipe 18 having a flange 20 attached thereto. Another flange 22 is attached with the flange 20 by suitable nut and bolt means 24, and a sealing gasket 30 is interposed between the flanges 20 and 22 to prevent water leakage. A bushing 28 which is externally threaded at 32 and internally threaded at 34, is used to connect the flange 22, with its internal threads 26, to a pipe cross 36.

The pipe cross 36 has four internally threaded portions which, for simplicity, can be designated A, B, C, and D. The portions A and C are coaxially aligned, while the portions B and D are likewise coaxially aligned at a 90° axial relationship with respect to the axis passing through the portions A and C. The pipe cross 36 is attached to the bushing body 28 by having the threaded portion A engaged with the threads 32. Inside the pipe cross 36, a pipe 38 is threaded within the internal threads 34 of the bushing, and an inlet pipe 40 is coupled with the pipe 38 by means of a threaded coupling 42.

In the pipe cross portion B, a bushing 44 is mounted, such bushing serving to connect the conduit means 16 with the pipe cross. The conduit means 16 includes a first pipe bend 46 coupled with a T connection 48. A first pipe 50 extends from the T 48 and terminates in a regulating elbow 52. Another pipe bend 54 extends from the T 48, with a second pipe 56 being coupled to this pipe bend. The pipe 56 terminates in an end cap 58.

The pipes 50 and 56 extend through the receptacle means 14.

As can best be seen from FIGURES 1 and 3, the receptacle means 14 is formed by a pair of downwardly converging side walls 60 interconnected by a pair of downwardly converging side walls 62. The top of the receptacle means is open, while the bottom thereof is formed by a bottom wall 64. The bottom wall terminates slightly short of one of the said side walls 62 to provide an outlet 66. Guide wall means 68 are mounted within the recptacle means 14 in spaced relation to the side walls 62. Each guide wall means 68 is preferably a plastic sheet having a serrated bottom edge 70 and having a pair of tabs 72 which extend through holes in the end walls 60 of the receptacle means.

The chlorinating material for the supply is provided between the spaced guide wall means 68. In the preferred form of invention, this chlorinating material is in the form of calcium hypochlorite tables generally designated 74. However, the invention need not necessarily be limited to such tablets, so long as the chlorinating material is a quantity of substantially dry water soluble material.

The pipes 50 and 56 extend through the spaces between the side walls 62 of the receptacle means and the guide walls 68 thereof. The pipe 50, which is spaced furthest away from the outlet 66, is provided with a small aperture means 76 through which water can flow. Similarly, the pipe 56 is provided with a pair of small openings 78 which are more or less aligned above the outlet 66. The T 48 is set at an angle so that the pipe 56 is slightly lower than the pipe 50. In this way, the receptacle means 14 is tilted so that the bottom wall 64 slopes downward toward the outlet 66.

In operation, assuming that water is supplied through the conduit means 16, a portion of such water will flow through the pipe 50 and another portion thereof will flow through the pipe 56. Since the pipe 56 is capped at 58, the water therewithin will drain slowly through the small apertures 78. As the water flows through the pipe 50, a portion thereof will drain through the aperture means 76, and the flow rate of the water through this aperture means can be regulated somewhat by adjusting the position of the elbow 52 at the end of the pipe 50. The water draining through the aperture means 76 will flow downwardly between one side wall 62 and a guide wall 68 and will pass along the sloped bottom wall 64 toward the outlet 66. As such, this water will dissolve the lowermost tablets 74 which are in contact with the sloped bottom wall 64. This, of course, will provide a hypochlorite solution which is diluted by the water draining from the apertures 78. This solution will then drain through the outlet 66 into the supply to chlorinate the same.

The portion D of the cross 36, which is opposed to the portion B thereof, serves to mount an enlarged pipe bend 80 whose position can be adjusted. As water flows out the end of the inlet pipe 40, part of such water will flow toward the pipe bend 80 and the other part thereof will flow toward the conduit means 16, as illustrated by the flow arrows in FIGURE 1. By properly adjusting the angle of the pipe bend 80 and the regulating elbow 52, the flow rate of water through the aperture means 76 can be adjusted, and this, in turn, controls the dissolution rate of the hypochlorite tablets, and hence, controls the rate of chlorination of the supply water.

Naturally, it is undesirable to continuously chlorinate the water supply, regardless of the level thereof, since this will result in too great a quantity of chlorine being provided when the supply remained full, as for example, at night. Therefore, the valve means 12 of the present invention is provided. Such valve means 12 includes a main valve assembly generally designated 82 and a pilot valve assembly generally designated 84.

Considering first the main valve assembly, it will be seen that a flange 90, internally threaded at 88, is screwed onto the externally threaded portion C of the cross 36. The flange has apertures 92 therewithin. A reducing thimble 94 is also provided, such thimble having an internally threaded reduced diameter neck 96. A flange plate 98 having internal threads 86 and apertures 100 therein is screwed onto external threads 87 on the large end of the thimble 94. Bolts 102 pass through the holes 92 and 100 to gradually urge the flange plate 98 toward the flange 90.

A flexible ruber differential diaphragm generally designated 104 acts as the main valve element. This diaphragm 104 is shaped to give a wide valve opening and includes a generally semicircular thickened central portion 106 adapted to seat against the end of the inlet pipe 40. A narrow orifice 108 extends through this central portion 106, substantially coaxially with the center of the pipe 40. The diaphragm 104 also includes a flange portion 110 which is sandwiched between the flanges 90 and 98. Hence, by properly tightening the bolts 102, the diaphragm 104 will be properly clamped into position. It will, of course, be understood, that as is conventional with valve diaphragms of this type, the diaphragm is movable between a closed position, as shown in FIGURE 2 whereat the portion 106 is engaged against the end of the inlet pipe 40, and an open position, as shown in FIGURE 1, whereat the same is spaced away from the end of the inlet pipe 40. A fine wire 112 extends through the orifice 108 to prevent the same from becoming clogged, such wire being retained by having its ends bent at an angle of 90 degrees to its axis.

Considering the pilot valve assembly 84, it will be seen that a tube 114 is threaded within the reduced diameter 96 of the thimble. A nut 116 is threaded onto the opposite end of this tube and a flat washer 118, which serves as pilot valve seat, is sandwiched between the end of the tube 114 and the nut. An elongated element in the form of a screw 120 having a head 122 extends through the opening in the washer 118. The screw 120 includes a threaded sleeve 124 which clamps a rubber washer 126 between the sleeve 124 and the head of the screw 122, such washer serving as the pilot valve element. Further along the screw 120, a sleeve 128 is mounted between a pair of nuts 130. A biasing spring 132 extends between the innermost nut 130 and the washer 118 which functions as the pilot valve seat. This spring 132 thus serves to normally bias the resilient washer 126 against the valve seat 118, thereby normally maintaining the pilot valve assembly in a closed condition.

However, the valve means of the present invention includes float control means which are controllably coupled thereto in such a manner that the valve means operates responsively to the level of the liquid within the reservoir being chlorinated. Such float control means includes a bracket as shown in FIGURE 5, such bracket including a main wall 140 having an opening 142 therein and a pair of forwardly extending ears 144, having lower holes 146 and upper holes 148 therein.

The float control bracket is coupled with the valve assembly by sliding the same over the threaded tube 114 and by sandwiching the border of the wall 140 surrounding the aperture 142 between the reduced diameter neck 96 on the thimble, and the nut 116 of the pilot valve assembly.

The hollow float 150 which is formed of plastic or other suitable material is weighted by the admission of water so that it floats half submerged in the liquid within the reservoir. A float arm generally designated 152 and formed as an elongated wire, serves to couple the float 150 with the bracket ears 144. The float arm includes an elongated portion 154 upon which the float 150 is mounted by means of a screw passing through an eye formed in the end of the wire. The float arm 152 at the end remote from the float has a generally U-shaped portion having a pair of legs 156, 156 which join together by a transversely extending portion 158.

In the high pressure type of pilot valve assembly, as is shown in FIGURES 1 and 2, the legs 156, 156 of the U-shaped portion fit through the lower holes 146 in the ears 144. As such, the portion 158 engages with the sleeve 128 of the pilot valve assembly.

In a modified or low pressure form of pilot valve assembly, as shown in FIGURE 6, a shorter screw 160 having an enlarged flat head 162 is utilized for mounting the washer 126. A short sleeve 134 and a washer 136 are fitted to the screw 160 and serve to locate the rubber washer 126 between the washer 136 and a pair of nuts 164. The washer 126 acts as a valve element, and the biasing spring 132 coacts beneath the underside of the enlarged head 162 and the valve seat 118. In this type of valve assembly, the arms 156, 156 of the U-shaped portion of the float arm are positioned within the upper holes 148 in the ears 144 of the bracket. Hence, in such position, the transversely extending portion 158 bears against the outer side of the enlarged head 162 on the screw 160.

To understand the manner in which the float control means cooperates with the pilot valve, it must be recognized that the float 150 is half submerged in the supply or liquid in the reservoir, and accordingly, such float raises and lowers as the liquid level in the reservoir varies. When the float 150 is in an elevated position, as when the reservoir is full, the U-shaped portion, and particularly the portion 158 thereof, will be lifted out of engagement with the pilot valve means 84. Hence, such pilot valve means will be in a closed condition whereat the valve element 125 is firmly seated against the valve seat 118. Both the biasing spring 132 and the pressure of the water within the reducing thimble 94 serve to maintain the pilot valve in this closed position. However, when the water level within the reservoir drops so that the ball or float 150 lowers, the U-shaped portion of the float arm 152, and particularly the portion 158 thereof, will abut against the pilot valve means. The water pressure in the reducing thimble 94 will maintain the pilot valve in the closed position until the water level in the reservoir falls about one inch. The reduced submergence of the float 150 provides the weight required to force at least a portion of the washer 126 out of engagement with the valve seat 118, thereby opening the pilot valve assembly.

In use, water from the source enters the pipe 18 and flows out of the end of the inlet pipe 40 inside the cross 36. Part of this water flows out through the bend 80, part flows out through the conduit means 16, and part flows through the orifice 108 in the main valve diaphragm 104. This portion which flows through the orifice 108 will gradually fill the interior of the reducing thimble 94 and will start to build up pressure therewithin. Since the area of the diaphragm means facing the reducing thimble 94 is of greater area than the rounded portion 106 which faces the inlet pipe 40, the pressure within the reducing thimble will gradually force the diaphragm means toward the inlet pipe 40 until the portion 106 engages with the end of the inlet pipe to close the same off. Of course, this will only occur if the pilot valve assembly 84 is closed, since if the same is open, the water entering the reducing thimble will merely exhaust through the pilot valve assembly. Thus, with the pilot valve closed, as it is when the level of the liquid within the supply or reservoir is at a relatively high amount, the main valve diaphragm means will gradually close off the end of the inlet pipe 40, thereby terminating flow through the conduit means and thereby terminating chlorination of the reservoir. This is particularly desirable, for example, at night, when the reservoir is full, and when the water therein has been chlorinated to a sufficient degree.

When, however, the water level in the reservoir has dropped one inch, the reduced submergence of the float 150 acting through the float arms 152 and the portion 158 thereof will cause the pilot valve assembly 84 to open. Of course, when the pilot valve opens, the pressurized water within the reducing thimble will exhaust therefrom, and the diaphragm means 104 will unblock the end of the inlet pipe 40. The incoming water can then again flow through the conduit means, thereby once again commencing a chlorinating operation.

It will, of course, be appreciated that operation of the chlorinating means of the present invention is directly controlled by the float control means thereof. By delaying opening of the valve until the water level in the reservoir has dropped one inch, a constant rate of flow is obtained through the valve while it is open, thus assuring a constant rate of chlorination. However, when chlorination is taking place, the rate of such chlorination can be selectively adjusted, and after such adjustment, the rate will remain constant. As the tablets 74 in contact with the base wall 64 are gradually dissolved, the overlying tablets will drop downwardly and will thereafter become dissolved. In practice, it is only necessary to replace the tablets every two to three days, rather than every two to three hours, as was the case with existing devices. Once every week or so, an attendant can remove any lime deposits from the receptacle means. It can thus be stated that the chlorinating unit of the present invention only operates at times when the reservoir needs to be chlorinated, as determined by the float control means, and when such chlorinating unit does operate, the same produces a constant chlorination rate, which can be adjusted as desired.

After reading the foregoing detailed description, it should be apparent that the objects set forth at the outset of the specification have been successfully achieved.

What is claimed is:

1. A chlorinating unit operative, upon coupling to a water source, to chlorinate a liquid supply, said unit comprising:

valve means coupled with said water source;

receptacle means adapted to contain a quantity of substantially dry water soluble chlorinating material; and conduit means interconnecting said valve means and said receptacle means;

said conduit means including spaced apart first and second branch conduit means, each including aperture means therein;

said valve means including float control means responsive to the level of liquid in said supply to control opening and closing of said valve means;

said first branch conduit means having its aperture means positioned so that when said valve means is open, water from said source will flow through said first branch conduit aperture means and into said receptacle means to dissolve a portion of said chlorinating material to create a chlorinated flow stream;

said second branch conduit means having its aperture means positioned so that, when said valve means is open, water from said source will flow through said second branch conduit aperture means and outside said chlorinating material in said receptacle means to form a flow stream which is prevented from contacting said chlorinating material and which hence provides an unchlorinated flow stream;

said receptacle means including an outlet adjacent the bottom of said receptacle means, said outlet communicating with said liquid supply, said unchlorinated flow stream combining with said chlorinated flow stream substantially at said outlet to prevent any dissolved chlorinating material from clogging said outlet and to dilute the chlorination level of said chlorinated flow stream, said unchlorinated and said chlorinated flow streams forming a combined flow stream which then enters said supply to chlorinate the liquid therewithin.

2. A unit as defined in claim 1 wherein said chlorinating material is in tablet form.

3. A unit as defined in claim 2 wherein said receptacle means includes a sloped bottom surface against which said tablets abut and wherein said outlet is aligned with said bottom surface so that water from said first branch conduit aperture means runs along said bottom surface and dissolves that portion of said tablets in contact therewith.

4. A unit as defined in claim 3 wherein said valve means includes a pilot valve and a main valve, said valves coacting in response to said float control means.

5. A unit as defined in claim 4 wherein said float control means is connected with said pilot valve so that said pilot valve opens when said float drops below a predetermined level and closes when said float rises to a predetermined level.

6. A unit as defined in claim 5 wherein said main valve includes an inlet pipe through which water from said source flows, a diaphragm having a first face engageable with the end of said inlet pipe and a second face directed toward said pilot valve, said diaphragm having an orifice therein extending between said faces so that, when said pilot valve is closed, said water will flow through said orifice to build up a pressure between said pilot valve and said second face, thus causing said first face to engage the end of said inlet pipe to terminate the flow of water therethrough until said pilot valve opens.

7. A unit as defined in claim 5 wherein said pilot valve includes an elongated element having a resilient member attached thereto, a valve seat against which said resilient element abuts, and biasing means normally urging said resilient member against said valve seat to normally close said pilot valve.

8. A unit as defined in claim 7 wherein said float control means includes a float member which floats upon the surface of said liquid in said supply and an elongated float arm coupled with said valve means, said float arm engaging against said elongated means when said float member drops below a predetermined level, to unseat said resilient member from said valve seat to open said pilot valve.

9. A unit as defined in claim 3 wherein said receptacle means further includes side wall means and interior guide wall means spaced therefrom, said tablets being disposed between said guide wall means and said first branch conduit means being disposed in the space between said side wall means and said guide wall means.

10. A unit as defined in claim 9 wherein said first branch conduit means includes an adjustable means for varying the flow rate through said aperture means.

References Cited
UNITED STATES PATENTS

| | | | |
|---|---|---|---|
| 598,103 | 2/1898 | La Fave | 23—272.7 |
| 1,736,890 | 11/1929 | Sweeney | 23—272 |
| 1,912,937 | 6/1933 | George | 251—40 |
| 2,551,494 | 5/1951 | Kaufmann | 23—272 |
| 2,588,242 | 3/1952 | Hunter | 137—414 |
| 2,738,323 | 3/1956 | Tepas | 23—272 |
| 2,820,701 | 1/1958 | Leslie | 210—169 |
| 3,145,087 | 8/1964 | Walker | 23—311 |
| 3,145,728 | 8/1964 | Sterrett et al. | 137—414 |
| 3,187,947 | 6/1965 | Ellis | 4—227 |

REUBEN FRIEDMAN, *Primary Examiner.*

SAMIH N. ZAHARNA, *Examiner.*

C. DITLOW, *Assistant Examiner.*